United States Patent [19]
Aikawa

[11] Patent Number: 6,122,117
[45] Date of Patent: Sep. 19, 2000

[54] METHOD FOR DIGITALLY DEMODULATING POSITION SIGNALS RECORDED ON RECORDING MEDIA

[75] Inventor: Koichi Aikawa, Kawasaki, Japan

[73] Assignee: Fujitsu Limited, Kawasaki, Japan

[21] Appl. No.: 09/018,516

[22] Filed: Feb. 4, 1998

[51] Int. Cl.[7] .............................. G11B 5/02; G11B 5/09; G11B 5/596

[52] U.S. Cl. ........................... 360/29; 360/46; 360/77.02

[58] Field of Search .......................... 360/29, 32, 77.05, 360/77.08, 77.11, 46, 77.02

[56] References Cited

U.S. PATENT DOCUMENTS 5,343,340  8/1994  Boutaghou et al. ................. 360/77.08

Primary Examiner—W. Chris Kim
Attorney, Agent, or Firm—Greer, Burns & Crain, Ltd.

[57] ABSTRACT

Disclosed is a method of demodulating a position signal in a magnetic disk device for reading servo burst signals, which have been recorded in a servo area of a magnetic disk, by a head, and outputting a position signal, which indicates a deviation from a reference position on a track, using the servo burst signals that have been read. The position signal demodulating method includes (1) recording first and second servo burst signals in the servo area alternately in the radial direction, (2) digitally sampling the first and second servo burst signals, which have been read by the head, at a frequency two or more times greater than a servo burst signal frequency, (3) calculating area information of each of first and second servo burst signal waveforms by summing absolute values of the digitally sampled values in regard to each of the first and second servo burst signals, and (4) outputting, as a position signal, the difference between the area information of the first servo burst signal waveform and the area information of the second servo burst signal waveform.

11 Claims, 14 Drawing Sheets

BURST PATTERN WAVEFORM → FULL-WAVE RECTIFIED WAVEFORM → INTEGRATED WAVEFORM

METHOD FOR DIGITALLY DEMODULATING POSITION SIGNALS RECORDED ON RECORDING MEDIA

BACKGROUND OF THE INVENTION

This invention relates to a method of demodulating the position signal of a magnetic disk device. More particularly, the invention relates to a magnetic disk position signal demodulating method for reading servo burst signals, which have been recorded in a servo area by a head, demodulating a position signal, which indicates a positional deviation from a reference position on a track, using the servo burst signals that have been read, and outputting the demodulated signal.

Systems for recording the servo signals of a magnetic disk device are classified broadly into a sector servo system and a dedicated servo system. In the sector servo system, a data area for writing information recorded by a user and a servo area in which a servo signal used for head positioning has been written are provided on the same side of a magnetic disk. More specifically, according to the sector servo system, each track is divided into a plurality of units referred to as sectors, and part of the sector (usually the head of the sector) is provided with the servo area. This system is also referred to as an embedded servo system. In the sector servo system, format efficiency (the ratio of the data area to the total disk surface) does not depend upon the number of disks. Consequently, the sector servo system is often employed in recent devices having only a small number of disks. Since servo information is provided for each disk surface, another feature is that the system is not readily susceptible to the effects of head position offset caused by thermal expansion or the like.

The dedicated servo system differs from the sector servo system in that the servo area is provided on the side of the disk opposite that having the data area. Ordinarily, one surface among a plurality of magnetic disk surfaces is used as the servo area and the remaining disk surfaces are used as the data areas. The dedicated servo system often is used when a magnetic disk device employs a large number (ten or more) of disks.

In a magnetic disk device in accordance with the sector servo system, as shown in FIG. 10, signals (data signals and servo burst signals) that have been recorded on a storage medium (magnetic disk) 1 are reproduced by a magnetic head 2, and the reproduced signals are input to a read/write signal processing circuit 4 via a head ID 3 that controls head changeover or the like. The read/write signal processing circuit 4 subjects the reproduced signals to preprocessing necessary for signal demodulation and inputs the processed signal to a data demodulating circuit 5 and servo circuit 6. The data demodulating circuit 5 demodulates user data using a signal (data signal) that has entered from the read/write signal processing circuit 4. The servo circuit 6 demodulates a position signal, which is for controlling head positioning, using a signal (servo burst signal) that has entered from the read/write signal processing circuit 4, and inputs a control voltage command to a VCM (voice coil motor) driver 7 to control the VCM 8 so as to position the head 1 on a track. This is referred to as an "on-track" operation.

This magnetic disk device according to the sector servo system is such that a disk surface is divided into a plurality of sectors and each sector is divided into a servo area and a data area, as set forth above. FIG. 11 is a partially enlarged view of a magnetic disk and is useful in describing sector configuration. A number of tracks are formed on a disk surface from the outer periphery to the inner periphery thereof and each track is composed of a plurality of sectors. Each sector is divided into a servo area SVA and a data area DTA. The servo area SVA is composed of a sector mark SM, a track number TNO, and a servo burst signal SVP. As shown in FIG. 12, the servo burst signal SVP is formed by alternately recording, at regular intervals in the radial direction, burst patterns BP1, BP2 having a prescribed recording frequency. Tracks TR each have a width P. The boundary between the burst patterns BP1, BP2 in the radial direction is the on-track position.

In accordance with the servo burst signal, peak values $P_A$, $P_B$ of head outputs read from the burst patterns BP1, BP2 are equal when the head 2 is at the center of the track (i.e., "on track"), as indicated at ② in FIG. 13. As the head deviates from the center of the track, as indicated at ①, ③ in FIG. 13, a difference between the peak values increases. Accordingly, $(P_A-P_B)$ can be adopted as a signal (a position signal) that conforms to the deviation from the center of a track. By arranging the tracking servo system (position servo system) so as to make the position signal $(P_A-P_B)$ equal to zero, the head can be positioned at track center at all times, thus making it possible to perform read/write accurately.

Positioning is carried out in a magnetic disk device to move a head from the present track position to a target track position. In such control for positioning the head, first a command velocity conforming to the number of tracks to the target track is generated and velocity control is performed in such a manner that actual velocity will come into agreement with the command velocity. When the head arrives above the target track, control is changed over from velocity control to position control and the head is positionally controlled to attain the track center position so that the position signal will become zero.

The foregoing is for a case where the position signal is generated based upon the difference between the peak values PA and PB When the signals obtained by reproducing the burst patterns BP1, BP2 read by the head are full-wave rectified and subsequently integrated, the integrated values (see FIG. 14) become equal at the on-track position. By full-wave rectifying the respective burst patterns BP1, BP2 read by the head, obtaining the integrated values using an analog integrating circuit and adopting the difference between the integrated values as the position signal, effects similar to those of the peak-hold scheme are obtained.

With the conventional magnetic disk device described above, however, it is necessary to provide a special-purpose analog circuit when detecting the peak values of waveforms or the integrated values in order to demodulate the position signal. This results in circuitry of larger scale and is disadvantageous in terms of size and cost. Moreover, with a demodulating circuit constituted by an analog circuit, it is generally difficult to perform signal demodulation of a high-speed sampling.

SUMMARY OF THE INVENTION

Accordingly, an object of the present invention is to provide a method of demodulating the position signal of a magnetic disk device, wherein the position signal can be demodulated in digital fashion.

Another object of the present invention is to provide a method of demodulating the position signal of a magnetic disk device, wherein demodulation of a position signal suited to high-speed sampling can be performed.

In accordance with the present invention, the foregoing object is attained by providing a method of demodulating a position signal in a magnetic disk device for reading servo burst signals, which have been recorded in a servo area of a magnetic disk by a head, and demodulating a position signal, which indicates a deviation from a reference position on a track, using the servo burst signals that have been read. The method includes (1) recording first and second servo burst signals in the servo area alternately in the radial direction, (2) digitally sampling the first and second servo burst signals, which have been read by the head, at a frequency two or more times greater than a servo burst signal frequency, (3) calculating area information of each of first and second servo burst signal waveforms by summing absolute values of the digitally sampled values in regard to each of the first and second servo burst signals, and (4) outputting, as a position signal, the difference between the area information of the first servo burst signal waveform and the area information of the second servo burst signal waveform.

Further, in accordance with the present invention, the foregoing object is attained by providing a method of demodulating a position signal in a magnetic disk device for reading servo burst signals, which have been recorded in a servo area of a magnetic disk by a head, and demodulating a position signal, which indicates a deviation from a reference position on a track, using the servo burst signals that have been read. The method includes (1) recording first and second servo burst signals in the servo area alternately in the radial direction, (2) digitally sampling the first and second servo burst signals, which have been read by the head, at a frequency two or more times greater than a servo burst signal frequency, (3) calculating, in regard to each of the first and second servo burst signals, and through use of the digitally sampled values, a cosine coefficient and a sine coefficient of signal components having a frequency identical with the servo burst signal frequency, (4) calculating amplitude information of each of the first and second servo burst signals by obtaining square roots of the sums of the squares of the respective cosine coefficients and sine coefficients, and (5) outputting, as a position signal, the difference between the amplitude information of the first servo burst signal and the amplitude information of the second servo burst signal.

Other features and advantages of the present invention will be apparent from the following description taken in conjunction with the accompanying drawings.

DESCRIPTION OF THE PREFERRED EMBODIMENTS

(A) Principle of the Present Invention

Figure 1:
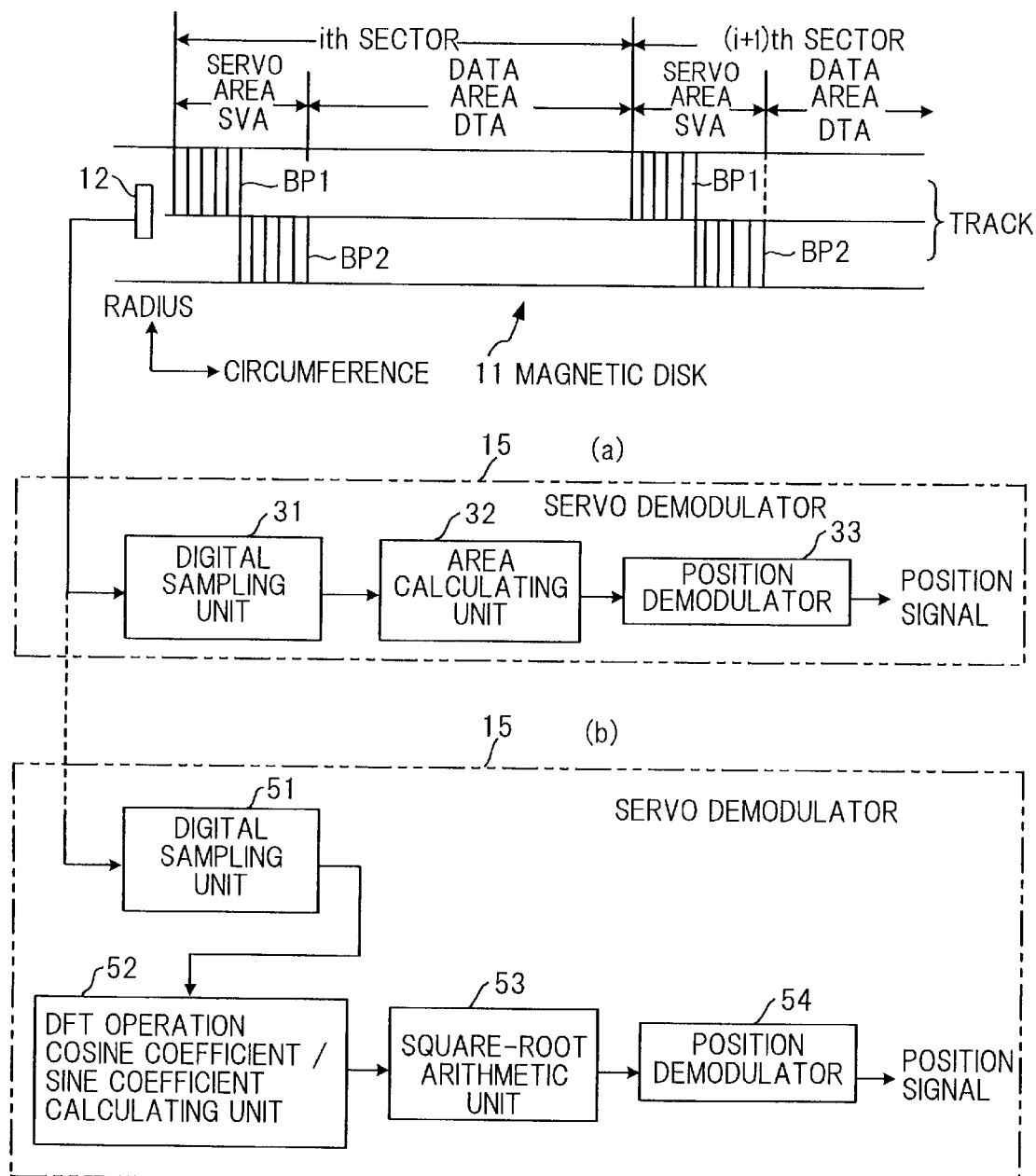
FIG. 1 is a diagram for describing the principle of the present invention.

FIG. 1 is a diagram for describing the principle of the present invention.

Numeral 11 denotes a magnetic disk the surface of which is divided into a plurality of sectors. Each sector is divided into a servo area SVA and a data area DTA. Recorded alternately in each servo area at regular intervals in the radial direction are first and second servo burst signals (burst pattern signals) BP1, BP2. Numeral 12 denotes a magnetic head and 15 a servo demodulator for demodulating a position signal and outputting the demodulated signal.

The servo demodulator may be considered to have the constructions illustrated in (a) and (b). In the servo demodulator 15 shown at (a), numeral 31 denotes a digital sampling unit for digitally sampling the first and second servo burst signals, which have been read by the head, at a frequency two or more times greater than the servo burst signal frequency. Numeral 32 denotes an area calculating unit for calculating the areas of the first and second servo burst signal waveforms by summing the absolute values of the digitally sampled values in regard to each of the first and second servo burst signals. Numeral 33 denotes a position demodulator for outputting, as a position signal, the difference between the areas of the first and second servo burst signal waveforms.

In the servo demodulator 15 shown at (b), numeral 51 denotes a digital sampling unit for digitally sampling the first and second servo burst signals, which have been read by the head, at a frequency two or more times greater than the servo burst signal frequency. numeral 52 denotes a cosine coefficient/sine coefficient calculating unit which uses the digitally sampled values for calculating, in regard to each of the first and second servo burst signals, a cosine coefficient and a sine coefficient of signal components having a frequency identical with the servo burst signal frequency. Numeral 53 denotes an arithmetic unit for calculating the square root of the sum of the squares of the cosine coefficient and sine coefficient. Numeral 54 denotes a position demodulator for calculating the amplitudes of the first and second servo burst signals from the square roots and outputting, as a position signal, the difference between the amplitudes of the first and second servo burst signals.

The first and second servo burst signals BP1, BP2 are recorded in the servo area SVA of the magnetic disk 11 alternately at fixed intervals in the radial direction. The digital sampling unit 31 digitally samples the first and second servo burst signals, which have been read by the head 12, at a frequency two or more times greater than the servo burst signal frequency. The area calculating unit 32 sums the absolute values of the digitally sampled values of each of the first and second servo burst signals, thereby calculating the areas of the waveforms of the first and second servo burst signals. The position demodulator 33 outputs the difference between the areas of the first and second servo burst signals as a position signal.

The digital sampling unit 51 digitally samples the first and second servo burst signals, which have been read by the head, at a frequency two or more times greater than the servo burst signal frequency. The cosine coefficient/sine coefficient calculating unit 52 uses the digitally sampled values to calculate, in regard to each of the first and second servo burst signals, a cosine coefficient and a sine coefficient of signal components having a frequency identical with the servo burst signal frequency. The arithmetic unit 53 calculates the square root (amplitude) of the sum of the squares of the cosine coefficient and sine coefficient. The position demodulator 54 outputs the difference between the amplitudes of the first and second servo burst signals as a position signal.

If the arrangements described above are adopted, a position signal can be demodulated digitally and it is possible to demodulate a position signal which supports high-speed sampling.

(B) First Embodiment

Figure 2:
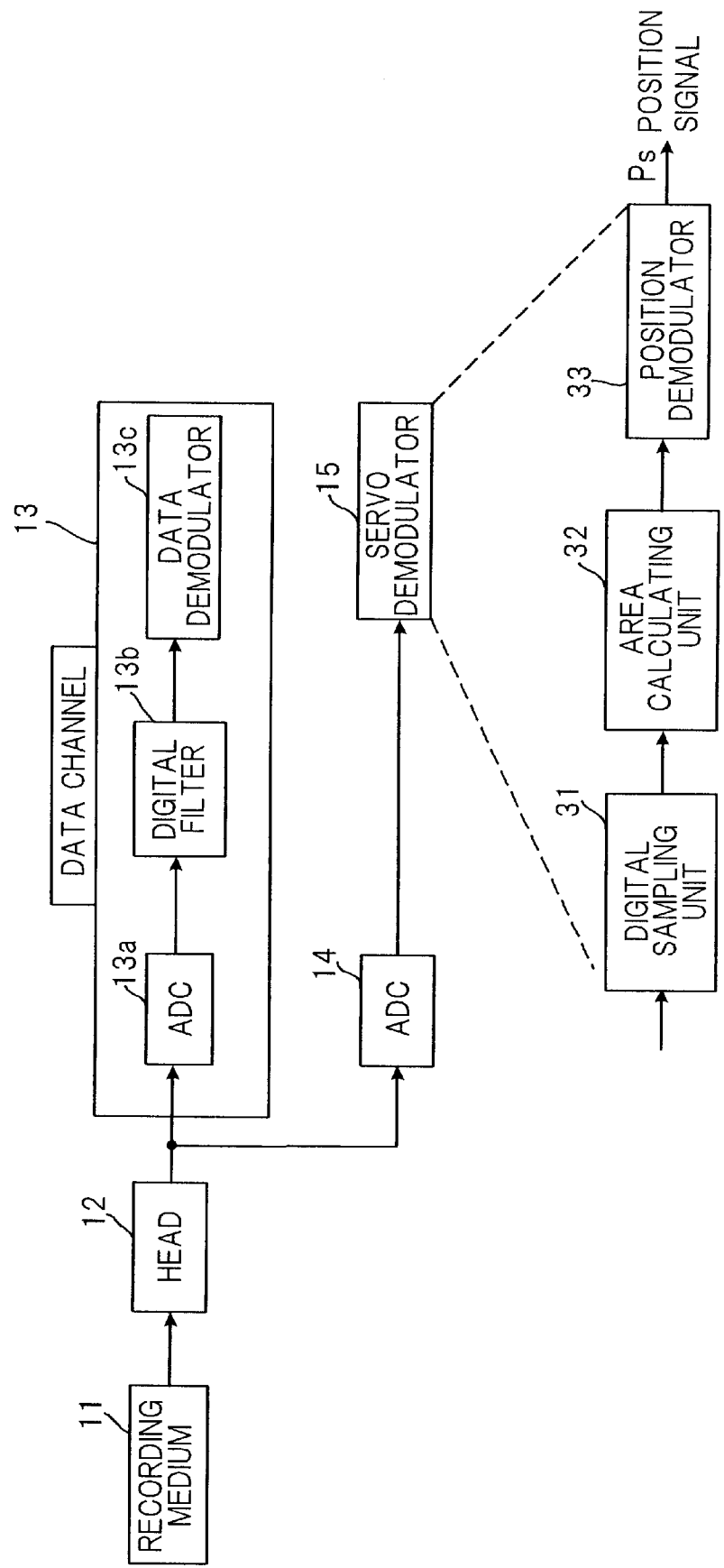
FIG. 2 is a diagram showing the construction of a first embodiment of the present invention.
Figure 12:
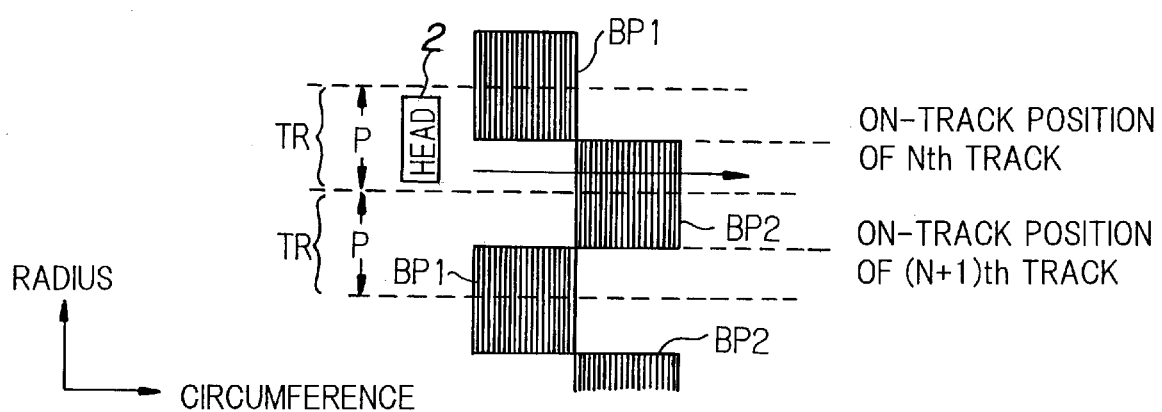
FIG. 12 is a diagram for describing conventional servo signal patterns.
Figure 13:
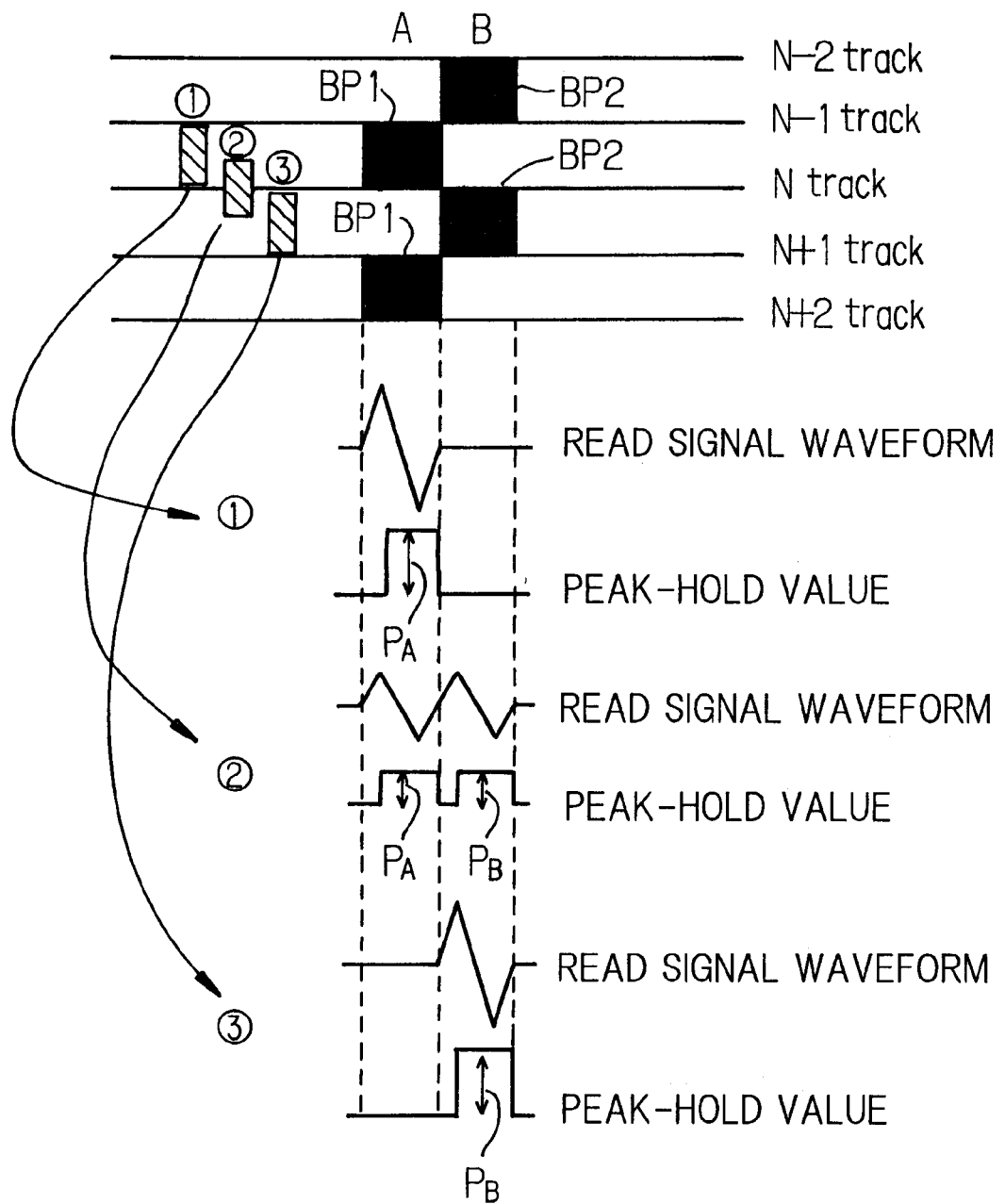
FIG. 13 is a diagram for describing a conventional position signal.
Figure 14:
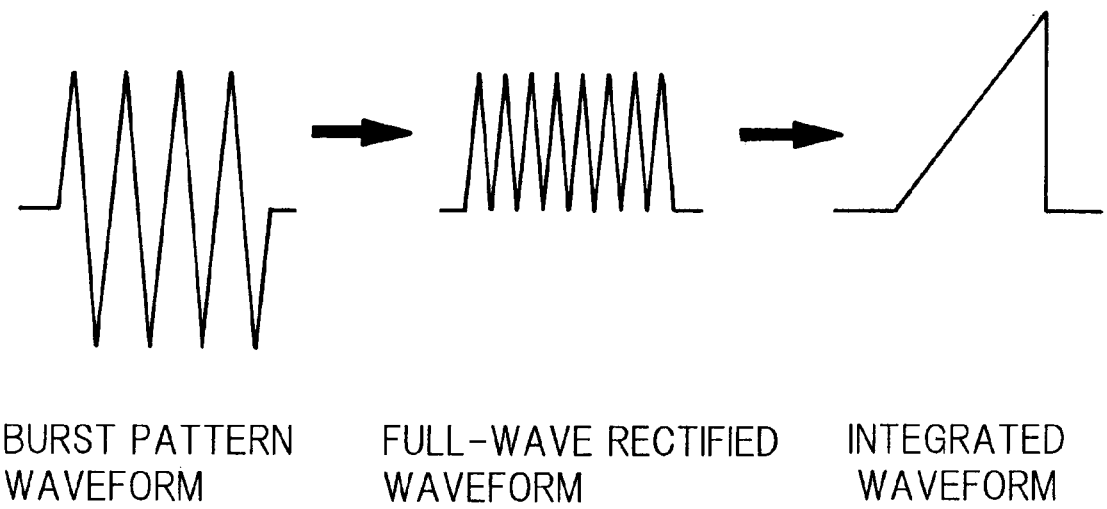
FIG. 14 is a diagram for describing an integrated waveform of a conventional burst pattern signal.

FIG. 2 is a diagram showing the construction of a first embodiment of the present invention. Numeral 11 denotes a storage medium (magnetic disk). Each track of the disk surface is divided into a plurality of sectors and each sector is divided into the servo area SVA and the data area DTA. In a manner similar to that shown in FIG. 12, the first and second servo burst signals BP1, BP2 are recorded alternately in each servo area at regular intervals in the radial direction. Numeral 12 denotes the magnetic head, 13 a data channel, 14 an AD converter (ADC) for digitally converting the first and second servo burst signals that have been reproduced by the head, and 15 the servo demodulator for demodulating and outputting the position signal.

In the data channel 13, numeral 13a denotes an AD converter for digitally converting a user data signal that has been reproduced by the magnetic head 12, 13b a digital filter for shaping the AD converter output to a form suited to the data demodulating circuitry, and 13c a data demodulator for demodulating the user data using the output of the digital filter. The digital filter 13b uses a (1+D) equalizer in a case where the equalizing method of the data demodulating circuitry is PR4 (Partial Response Class 4). A (1+D) equalizer is an arithmetic unit for adding a currently prevailing digitally sampled value and the immediately preceding sampled value, where D signifies a delay operator for one sampling time period.

Figure 3:
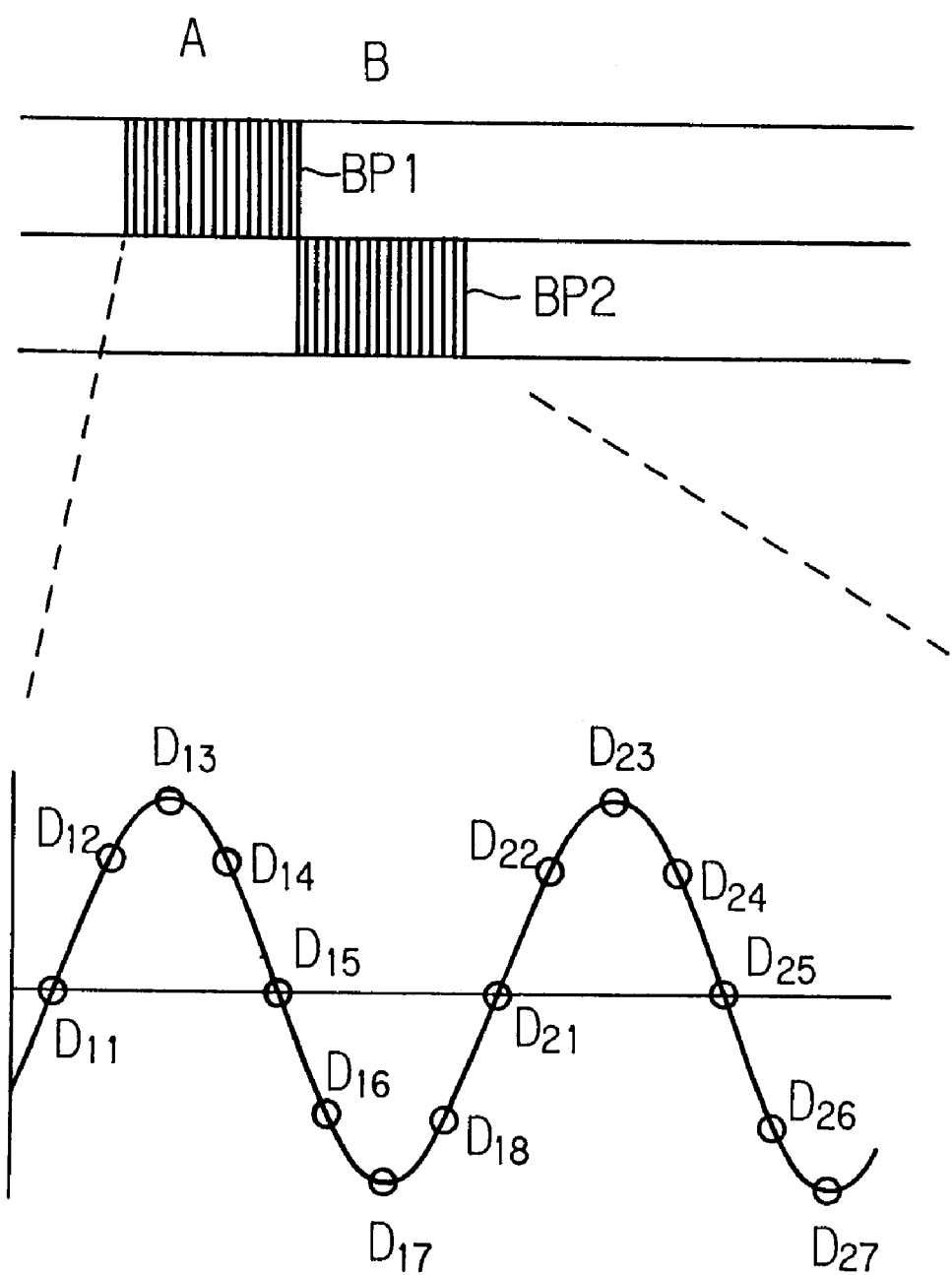
FIG. 3 is a diagram for describing sampling of a servo burst signal.

In the servo demodulator 15, numeral 31 denotes a digital sampling unit for digitally sampling the first and second servo burst signals, which have been read by the head, at a frequency two or more times greater than the servo burst signal frequency. In this embodiment, sampling is performed at eight points per period of the servo burst signals, as illustrated in FIG. 3. It is of course permissible to perform sampling at more than eight points.

Numeral 32 denotes the area calculating unit for calculating the areas $S_A$, $S_B$ of the first and second servo burst signal waveforms by summing the absolute values of the digitally sampled values in regard to each of the first and second servo burst signals that have been read. More specifically, the area calculating unit 32 calculates the areas $S_A$, $S_B$ of the read first and second servo burst signals in accordance with the following equation:

$$S = \sum_{m=1}^{M} \sum_{n=1}^{8} |D_{mn}| \quad (1)$$

where S represents the area and M the burst frequency. Though M=1 will work, demodulation accuracy can be improved by making M equal to or greater than two.

Numeral 33 denotes the position demodulator for outputting, as a position signal $P_S$, the difference between the areas $S_A$, $S_B$ of the first and second servo burst signal waveforms. The position demodulator 33 outputs the position signal $P_S$ in accordance with the following equation:

$$P_S = (S_A - S_B)/(S_A + S_B) \quad (2)$$

It should be noted that the difference between the area values is divided by the sum of the area values in Equation (2) in order to perform normalization. However, normalization is not always necessary.

The digital sampling unit 31 digitally samples the first and second servo burst signals, which have been read by the head 12, at a frequency two or more times greater than the servo burst signal frequency, the area calculating unit 32 sums the absolute values of the digitally sampled values in regard to each of the first and second servo burst signals in accordance with Equation (1), thereby calculating the areas $S_A$, $S_B$ of the waveforms of the first and second servo burst signals, and the position demodulator 33 outputs the difference between the areas of the first and second servo burst signals as the position signal $P_S$ in accordance with Equation (2).

If the arrangement described above is adopted, the position signal $P_S$, which conforms to the difference between the area values of the first and second servo burst signals that have been read by the head, can be demodulated digitally and it is possible to demodulate a position signal which supports high-speed sampling.

Figure 4A:
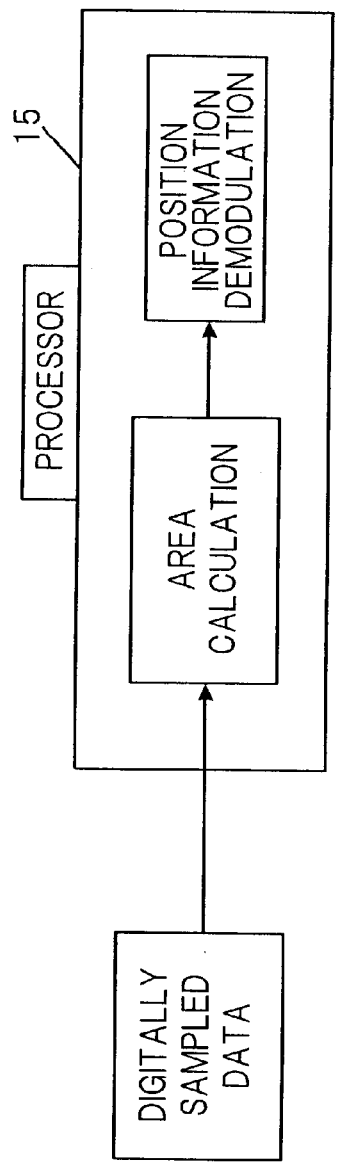
FIGS. 4A and 4B are examples of construction of a servo demodulator according to the first embodiment.
Figure 4B:
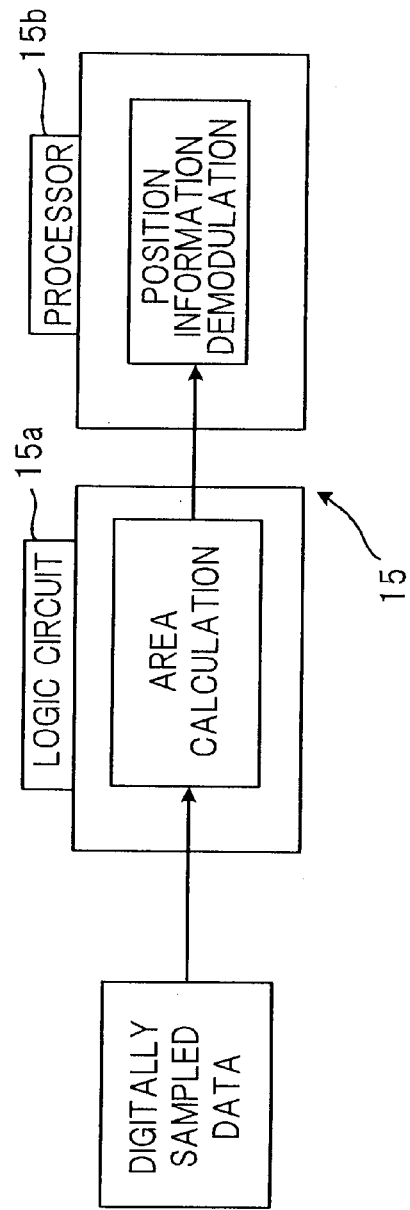

FIGS. 4A and 4B are examples of construction of the servo demodulator 15 according to the first embodiment. FIG. 4A shows an example in which the servo demodulator 15 is constituted by a processor such as a DSP (Digital Signal Processor). This processor executes the calculation of area in accordance with Equation (1) and the position signal demodulation processing in accordance with Equation (2). FIG. 4B shows an example in which the servo demodulator 15 is constituted by a logic circuit 15a such as an FPGA (Field Programmable Gate Array) composed of adder circuits, and a processor 15b such as a DSP. The logic circuit 15a executes the calculation of area in accordance with Equation (1) and the processor 15b executes the position signal demodulation processing in accordance with Equation (2).

(C) Second Embodiment

The first embodiment relates to a case where the difference between the areas of the first and second servo burst signal waveforms read by the head is found digitally and adopted as the position signal. The second embodiment is one in which the difference between the amplitudes of the first and second servo burst signal waveforms read by the head is found digitally and adopted as the position signal.

Figure 5:
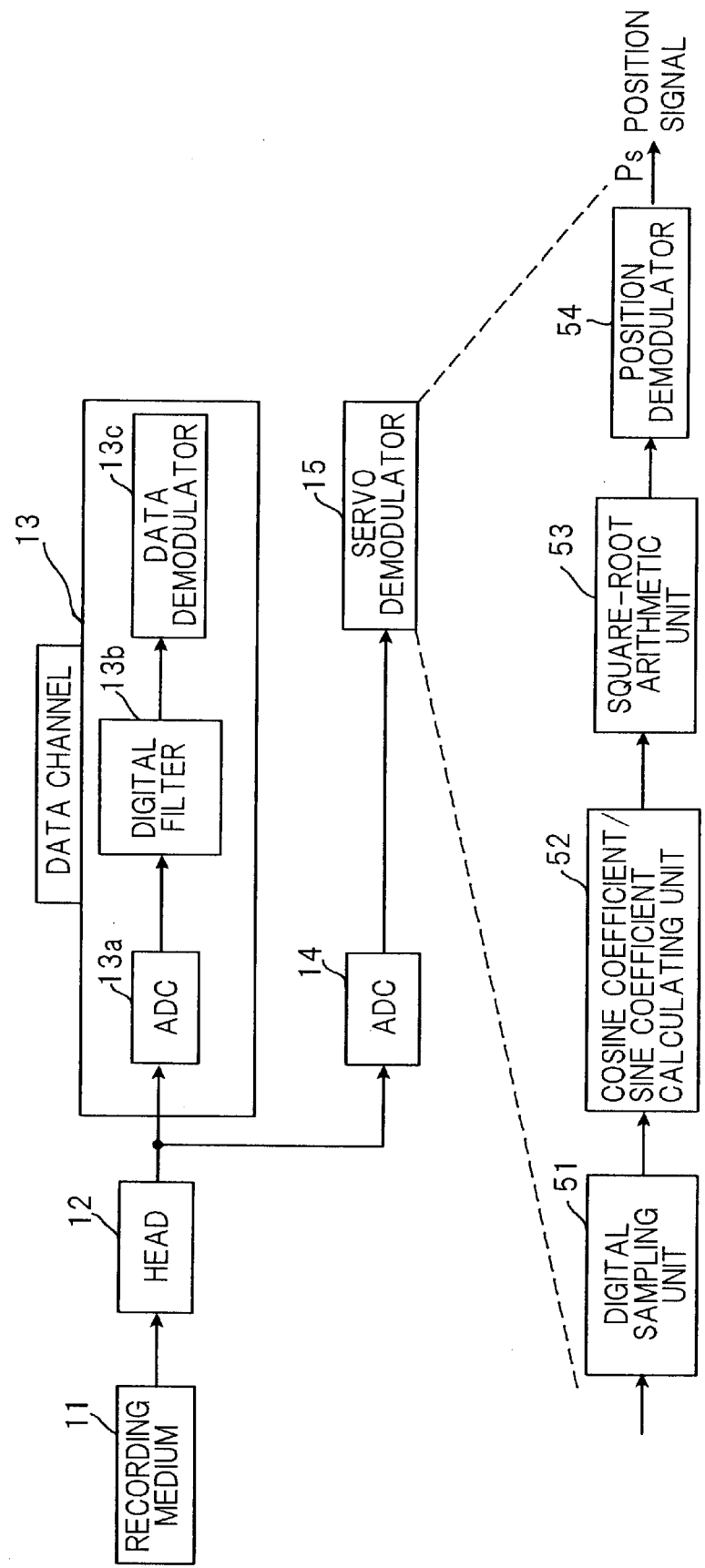
FIG. 5 is a diagram showing the construction of a second embodiment of the present invention.

FIG. 5 is a diagram showing the construction of a second embodiment of the present invention. Numeral 11 denotes the storage medium (magnetic disk). Each track of the disk surface is divided into a plurality of sectors and each sector is divided into the servo area SVA and the data area DTA. In a manner similar to that shown in FIG. 12, the first and second servo burst signals BP1, BP2 are recorded alternately in each servo area at regular intervals in the radial direction. Numeral 12 denotes the magnetic head, 13 the data channel, 14 the AD converter (ADC) for digitally converting the first and second servo burst signals that have been reproduced by the head, and 15 the servo demodulator for demodulating and outputting the position signal.

In the data channel 13, numeral 13a denotes the AD converter for digitally converting a user data signal that has been reproduced by the magnetic head 12, 13b the digital filter for shaping the AD converter output to a form suited to the data demodulating circuitry, and 13c the data demodulator for demodulating the user data using the output of the digital filter.

Figure 6:
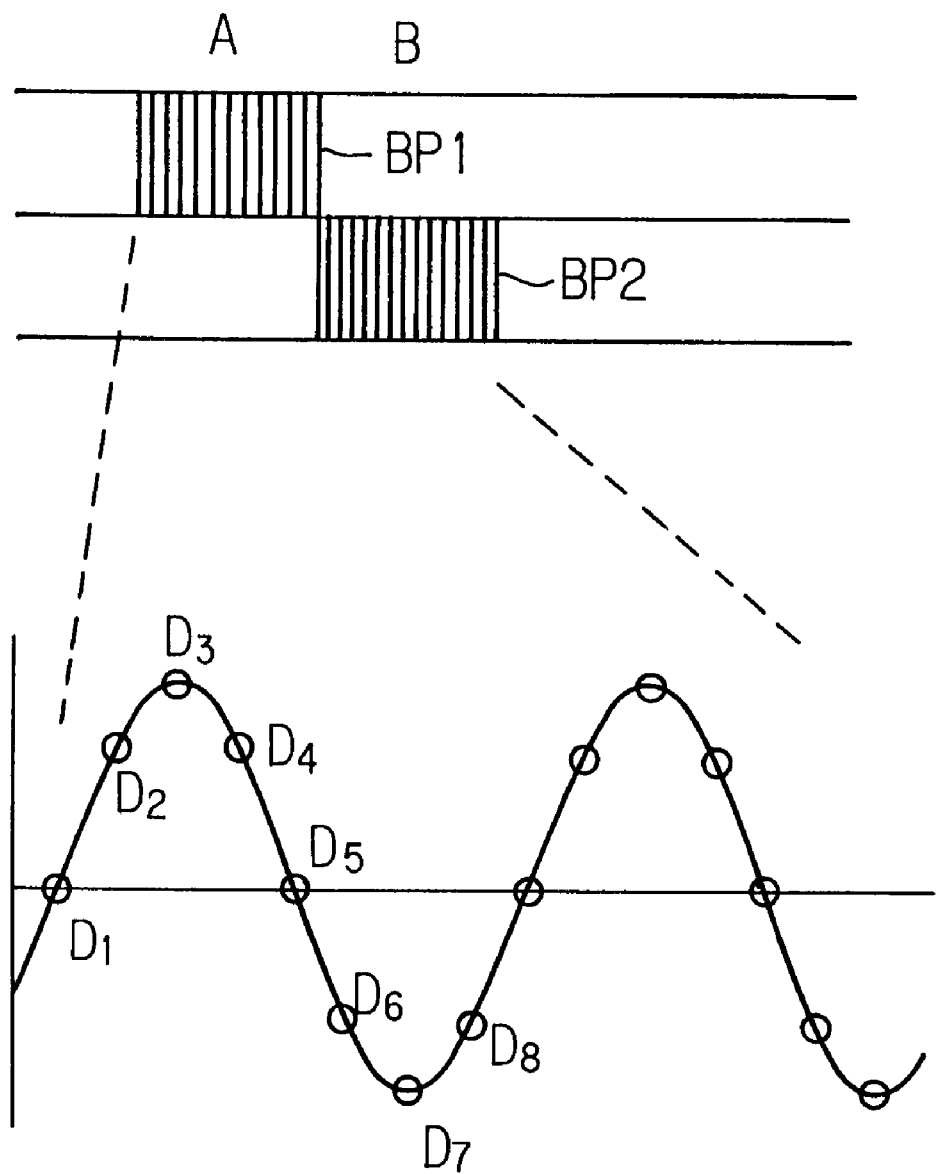
FIG. 6 is a diagram for describing sampling of a servo burst signal.

In the servo demodulator 15, numeral 51 denotes the digital sampling unit for digitally sampling the first and second servo burst signals, which have been read by the head, at a frequency two or more times greater than the servo burst signal frequency. In this embodiment, sampling is performed at eight points per period of the servo burst signals, as illustrated in FIG. 6. It is of course permissible to perform sampling at more than eight points. In order to perform a DFT operation, however, it is preferred that the number of sampling points be $2^n$ (where n is an integer). Further, though it is sufficient to sample only one period of the servo burst signals, sampling more than one period of the servo burst signals improves demodulating accuracy.

Numeral 52 denotes the cosine coefficient/sine coefficient calculating unit (DFT arithmetic unit) which uses the digitally sampled values to calculate, in regard to each of the first and second servo burst signals, a cosine coefficient and a sine coefficient of signal components having a frequency identical with the servo burst signal frequency. Numeral 53 denotes the arithmetic unit for calculating the square roots (amplitudes) of the sums of the squares of the cosine coefficients and sine coefficients. Numeral 54 denotes the position demodulator for outputting, as the position signal $P_S$, the difference between the square roots (amplitudes) obtained by the square root arithmetic unit 53.

In general, the expansion of a Fourier series as well as its cosine coefficients $A_n$ and sine coefficients $B_n$ are given by the following Equations (3), (4) and (5):

$$f(x) = \frac{A_0}{2} + \sum_{n=1}^{\infty}(A_n\cos nx + B_n\sin nx) \quad (3)$$

$$A_n = \int_0^{2\pi} f(x)\cos nx\, dx \quad (4)$$

$$B_n = \int_0^{2\pi} f(x)\sin nx\, dx \quad (5)$$

Accordingly, if a cosine coefficient $A_1$ and a sine coefficient $B_1$ at a fundamental frequency (n=1) are obtained from the foregoing equations, then amplitude information of the sampled waveforms can be obtained in accordance with the following equation:

$$P = \sqrt{A_1^2 + B_1^2} \quad (6)$$

It should be noted that the fundamental frequency is a signal having a frequency identical with that of the servo burst signals.

Thus, a cosine coefficient and a sine coefficient are obtained by a DFT operation from values $D_n$ digitally sampled as shown in FIG. 6, and the square root of the sum of the squares of these coefficients is found in accordance with Equation (6), thereby making it possible to compute amplitude information of the servo burst signal waveforms read by the head.

In a case where eight points are sampled, as shown in FIG. 6, the computation of the cosine and sine coefficients is as follows:

If Equation (3) is expressed in complex form using Euler's formula, we have $$f(x) = \Sigma\, C_k \exp(inx) \quad (7)$$

and a Fourier coefficient expressed in complex form will be given by $$C_k = \frac{1}{N}\sum_{n=0}^{N-1} D_n \exp(-2\pi kni/N) \quad (8)$$

The Fourier coefficient $C_k$ expressed in complex form and a cosine coefficient $A_k$ and sine coefficient $B_k$ in Equations (4), (5) are related by the following equation:

$$C_k = A_k + iB_k \quad (9)$$

Since the real numbers in Equations (8), (9) are equal to each other and the imaginary numbers are equal to each other, obtaining the cosine coefficient $A_1$ and sine coefficient $B_1$ in a case where k=1 holds results in the following equations:

$$A_1 = (D_1 - D_5) + (D_2 - D_4 - D_6 + D_8)/\sqrt{\sqrt{2}} \quad (10)$$

$$B_1 = (D_3 - D_7) + (D_2 + D_4 - D_6 - D_8)/\sqrt{\sqrt{2}} \quad (11)$$

Accordingly, if the cosine coefficient $A_1$ and sine coefficient $B_1$ are found from Equations (10), (11), the amplitude P can be obtained in accordance with Equation (6).

The foregoing is for a case where eight points are sampled. The cosine coefficient $A_1$ and sine coefficient $B_1$ are calculated by a DFT operation using Equations (8), (9) in similar fashion in a case where there are $2^n$ sampling points as well.

Thus, the digital sampling unit 51 digitally samples the first and second servo burst signals, which have been read by the head, at a frequency two or more times greater than the servo burst signal frequency. The sine coefficient/cosine coefficient calculating unit (DFT arithmetic unit) 52 calculates cosine coefficients and sine coefficients $A_{11}$, $B_{11}$; $A_{21}$, $B_{21}$ in regard to the read first and second servo burst signals, respectively, from Equations (10), (11) using the digitally sampled values. The arithmetic unit 53 calculates the square roots $$P_A\left(=\sqrt{A_{11}^2 + B_{11}^2}\right),$$

$$P_B\left(=\sqrt{A_{21}^2 + B_{21}^2}\right),$$

of the sums of the squares of the cosine and sine coefficients in regard to respective ones of the first and second servo burst signals using Equation (6). That is, the arithmetic unit 53 calculates the amplitudes of the first and second servo burst signals. The position demodulator 54 outputs the position signal $P_S$ in accordance with the following equation:

$$P_S=(P_A-P_B)/(P_A+P_B) \quad (12)$$

It should be noted that the difference between the amplitude values is divided by the sum of the amplitude values in Equation (12) in order to perform normalization. However, normalization is not always necessary.

If the arrangement described above is adopted, the position signal can be demodulated digitally based upon the difference between the amplitudes of the first and second servo burst signals that have been read by the head, and it is possible to perform demodulation of a position signal that supports high-speed sampling.

Figure 7A:
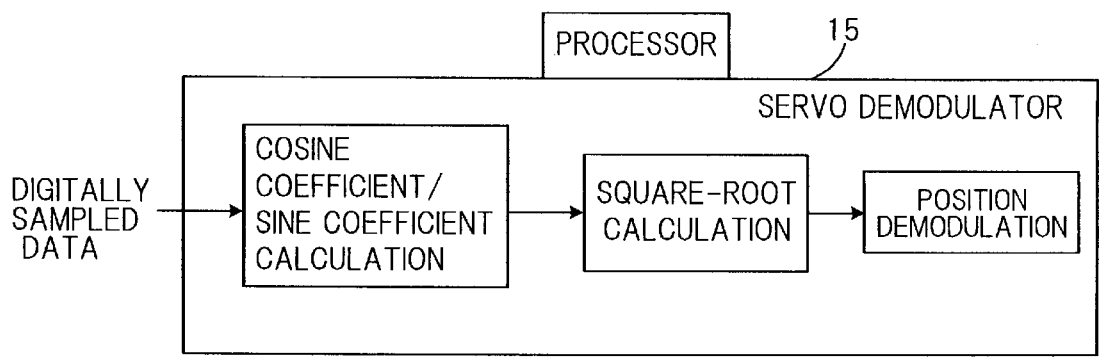
FIGS. 7A through 7C are examples of construction of a servo demodulator according to the second embodiment.
Figure 7B:
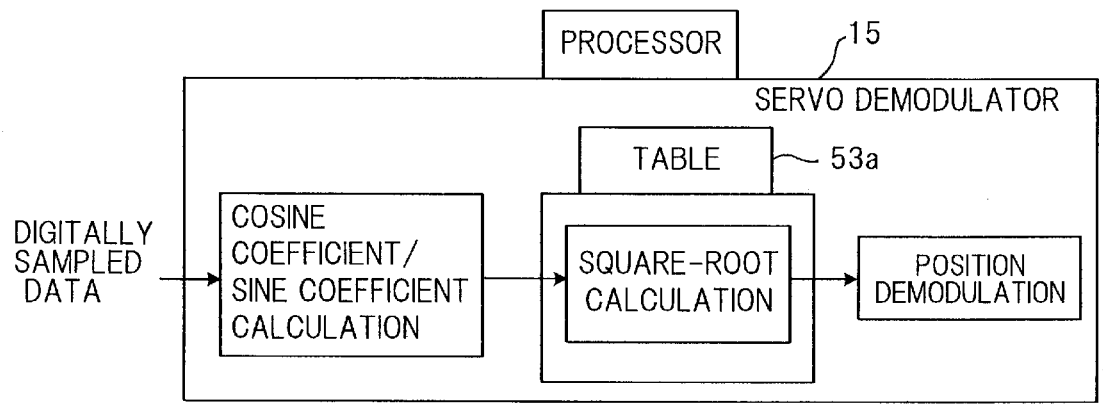
Figure 7C:
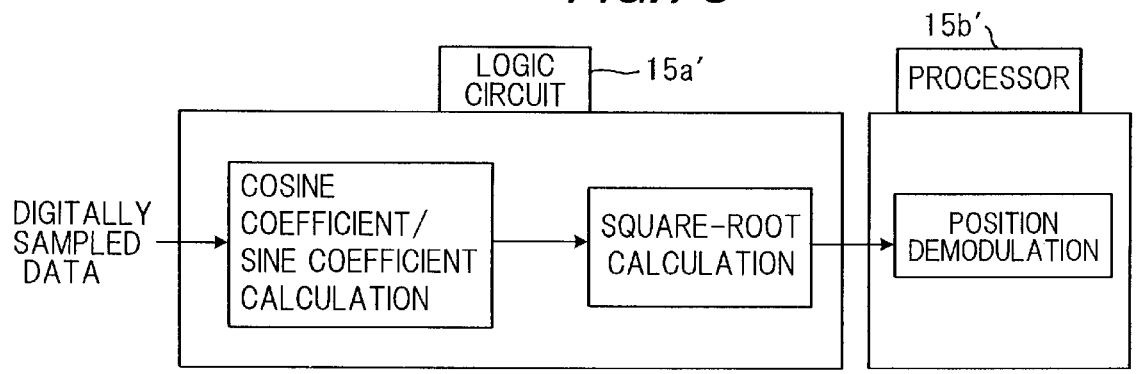

FIGS. 7A through 7C are examples of construction of the servo demodulator 15 according to the second embodiment. FIG. 7A shows an example in which the servo demodulator 15 is constituted by a processor such as a DSP (Digital Signal Processor). This processor executes the calculation of the cosine/sine coefficients of the first and second servo burst signals, the calculation of the square roots (amplitudes) and the position signal demodulation processing.

FIG. 7B shows an example in which, in a manner similar to that of FIG. 7A, the servo demodulator 15 is constituted by a processor such as a DSP (Digital Signal Processor) and executes the calculation of the cosine/sine coefficients of the first and second servo burst signals, the calculation of the square roots (amplitudes) and the position signal demodulation processing. This servo demodulator further uses a table 53a to perform the square-root calculations.

Calculations for obtaining the square root of the sum of the squares of the cosine and sine coefficients requires considerable time. Accordingly, square roots of sums of squares corresponding to combinations of cosine and sine coefficients are calculated and tabulated in advance and square roots of sums of the squares of cosine and sine coefficients are found from the table. This makes it possible to shorten computation time.

FIG. 7C shows an example in which the servo demodulator 15 is constituted by a logic circuit 15a' and a processor 15b' such as a DSP. This logic circuit executes the calculation of the cosine/sine coefficients and the calculation of the square roots of the sum of the square of the coefficients, and the processor executes the position signal demodulation processing.

(D) Modifications

According to the first and second embodiments, AD converters are provided independently for the data channel and servo channel. However, these can be constructed as a single common converter.

Figure 8:
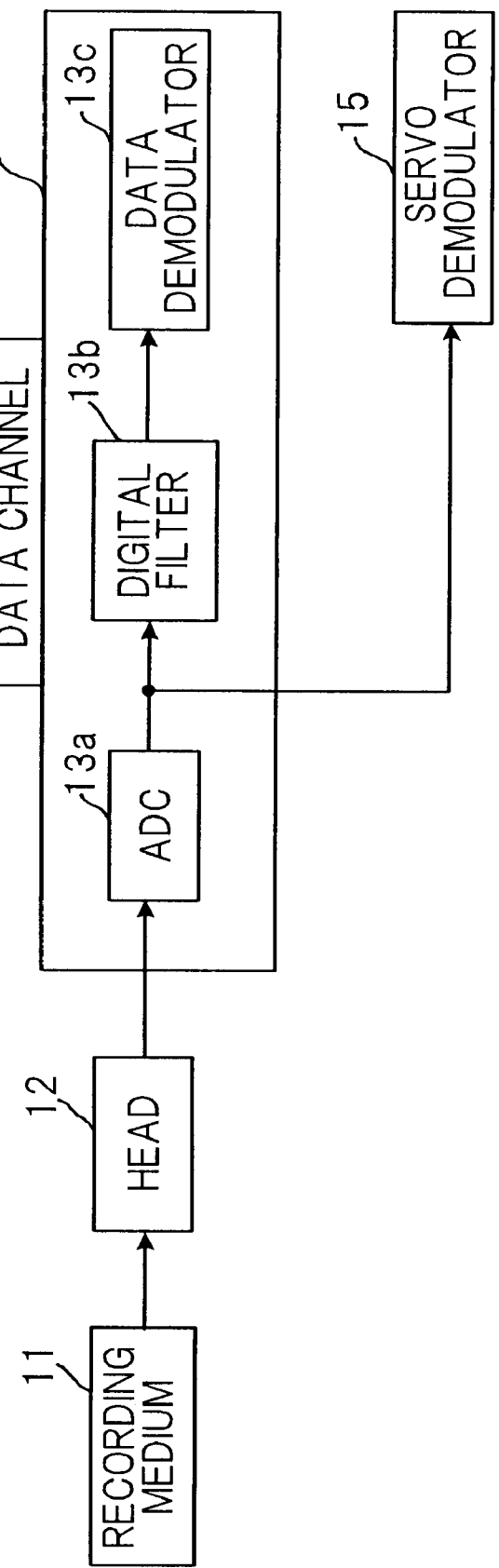
FIG. 8 is a first modification of the present invention.

FIG. 8 is a first modification, in which components identical with those of the first embodiment shown in FIG. 2 are designated by like symbols. Further, the arrangements of the first and second embodiments can be employed as the servo demodulator 15.

FIG. 8 differs from the first embodiment in that the AD converter 14 of the first embodiment is eliminated and the output of the AD converter 13a provided in the data channel 13 is input to the servo demodulator 15. By virtue of this arrangement, the AD converters can be shared by the data and servo channels, the scale of the circuitry can be reduced and there are advantages is terms of cost.

Figure 9:
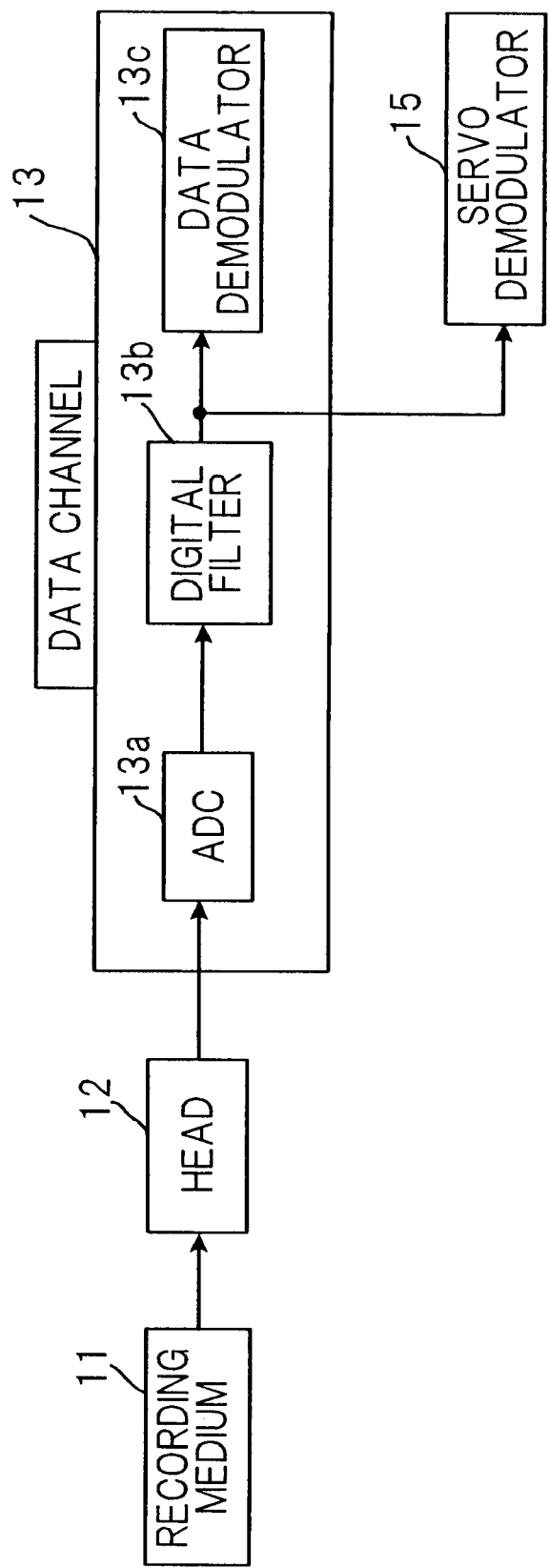
FIG. 9 is a second modification of the present invention.
Figure 10:
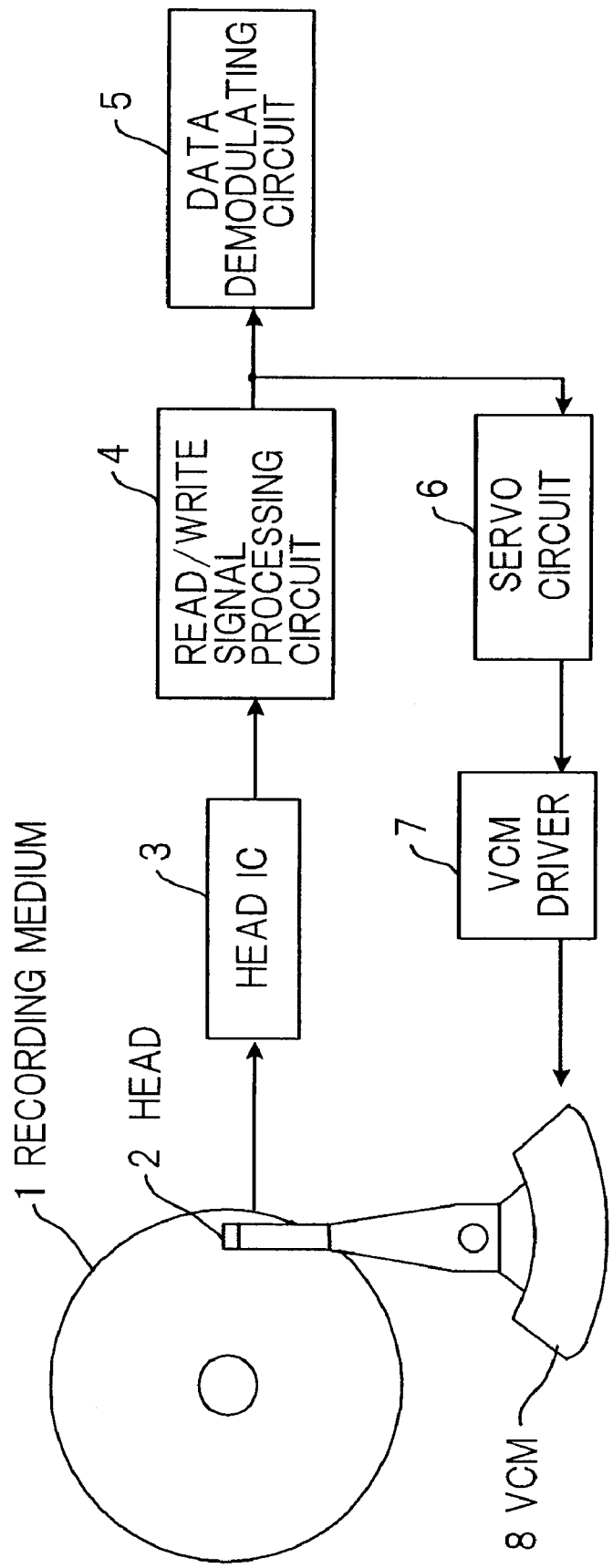
FIG. 10 is a diagram showing the construction of a conventional magnetic disk device.
Figure 11:
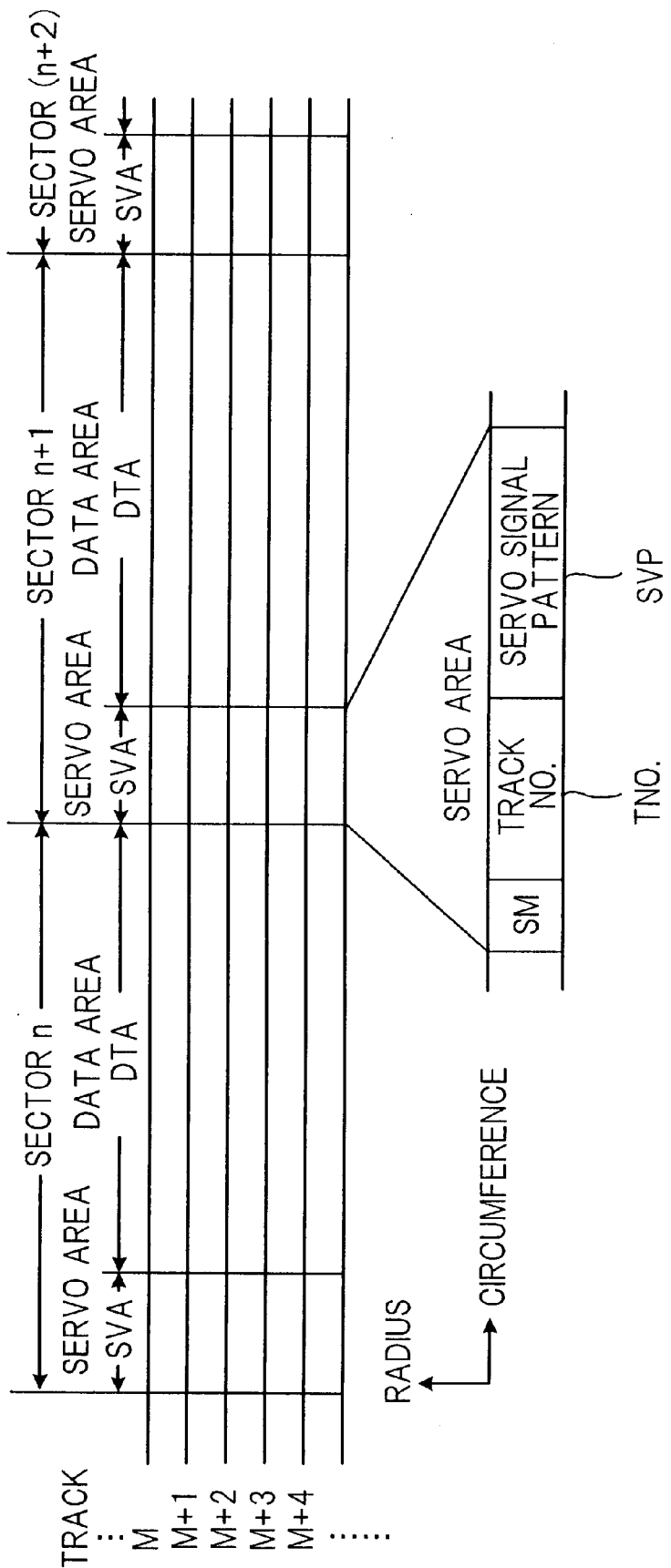
FIG. 11 is a diagram showing the structure of a conventional sector.

FIG. 9 is a second modification, in which components identical with those of the first embodiment shown in FIG. 2 are designated by like symbols. Further, the arrangements of the first and second embodiments can be employed as the servo demodulator 15.

FIG. 9 differs from the first embodiment in that the AD converter 14 of the first embodiment is eliminated and the output of the digital filter 13b provided in the data channel 13 is input to the servo demodulator 15. By virtue of this arrangement, the AD converters can be shared by the data and servo channels, the scale of the circuitry can be reduced and there are advantages is terms of cost. Further, since the digital filter 13b, which is constituted by the (1+D) equalizer, has a low-pass filter function, it is possible to reduce an error produced when the DFT operation is performed by the servo demodulator 15.

Thus, in accordance with the present invention, it is so arranged that first and second servo burst signals are recorded in a servo area alternately in the radial direction, the first and second servo burst signals, which have been read by a head, are digitally sampled at a frequency two or more times greater than the servo signal frequency, area information pertaining to the waveforms of the first and second servo burst signals is calculated by summing absolute values of the digitally sampled values regarding each of the first and second servo burst signals, and the difference between the area information of the first servo burst signal waveform and the area information of the second servo burst signal waveform is output as a position signal. As a result, a position signal $P_S$, which conforms to the difference between the area values of the first and second servo burst signals, can be demodulated digitally, and it is possible to perform demodulation of a position signal that supports high-speed sampling.

In accordance with the present invention, it is so arranged that first and second servo burst signals are recorded in a servo area alternately in the radial direction, the first and second servo burst signals, which have been read by a head, are digitally sampled at a frequency two or more times greater than the servo signal frequency, cosine coefficients and sine coefficients are calculated in regard to respective ones of the first and second servo burst signals using the digitally sampled values, the amplitudes of the first and second servo burst signals are calculated by obtaining the square roots of the sums of the squares of these coefficients, and the difference between the amplitudes of the first and second servo burst signals is output as a position signal. As a result, a position signal can be demodulated digitally based upon the difference between the amplitudes of the first and second servo burst signals, and it is possible to perform demodulation of a position signal that supports high-speed sampling.

In accordance with the present invention, it is so arranged that the output of an AD converter or digital filter provided in a data channel is input to a servo demodulator. As a result, the AD converter can be shared by both the data channel and a servo channel, the scale of the circuitry can be reduced and there are advantages in terms of cost. Further, since the digital filter has a low-pass filter function, it is possible to reduce an error produced when a DFT operation is performed by the servo demodulator.

Though a case has been described in which the present invention is applied to a sector servo system, it goes without saying that the invention can be applied to a dedicated servo system as well.

Further, the position signal demodulating method of the present invention is ideal for application to a PRML (Partial Response Maximum Likelihood) disk drive method.

As many apparently widely different embodiments of the present invention can be made without departing from the spirit and scope thereof, it is to be understood that the invention is not limited to the specific embodiments thereof except as defined in the appended claims.

What is claimed is:

1. A method of demodulating a position signal in a magnetic disk device for reading first and second servo burst signals, which have been recorded in a servo area of a magnetic disk alternately in the radial direction, by a head, and demodulating a position signal, which indicates a deviation from a reference position on a track, using the first and second servo burst signals that have been read, comprising:

digitally sampling the first and second servo burst signals, which have been read by the head, at a frequency two or more times greater than a servo burst signal frequency;

calculating area information of each of first and second servo burst signal waveforms by summing absolute values of digitally sampled values of respective ones of the first and second servo burst signals; and calculating, as a position signal, the difference between the area information of the first servo burst signal waveform and that of the second servo burst signal waveform.

2. A method of demodulating a position signal according to claim 1, wherein in a case where a signal that has been read by the head is AD-converted and input to a data demodulator, the position signal is demodulated using the AD-converted signal.

3. A method of demodulating a position signal according to claim 1, wherein in a case where a signal that has been read by the head is AD-converted, subsequently digitally filtered and input to a data demodulator, the position signal is demodulated using the digitally filtered signal.

4. A method of demodulating a position signal in a magnetic disk device for reading first and second servo burst signals, which have been recorded in a servo area of a magnetic disk alternately in the radial direction, by a head, and demodulating a position signal, which indicates a deviation from a reference position on a track, based upon amplitudes of the first and second servo burst signals that have been read, comprising:

digitally sampling the first and second servo burst signals, which have been read by the head, at a frequency two or more times greater than a servo burst signal frequency;

calculating, in regard to each of the first and second servo burst signals and through use of digitally sampled values of the first and second servo burst signals, a cosine coefficient and a sine coefficient of signal components;

calculating square roots of the sums of the squares of the respective cosine coefficients and sine coefficients, the calculated square roots being amplitude information of each of the first and second servo burst signals; and outputting, as a position signal, the difference between the amplitude information of the first servo burst signal and the amplitude information of the second servo burst signal.

5. A method of demodulating a position signal according to claim 4, wherein in a case where a signal that has been read by the head is AD-converted and input to a data demodulator, the position signal is demodulated using the AD-converted signal.

6. A method of demodulating a position signal according to claim 4, wherein in a case where a signal that has been read by the head is AD-converted, subsequently digitally filtered and input to a data demodulator, the position signal is demodulated using the digitally filtered signal.

7. A method of demodulating a position signal according to claim 4, wherein the calculated cosine coefficient and the sine coefficient are respectively a cosine coefficient and a sine coefficient of signal components having a frequency identical with the servo burst signal frequency.

8. A position signal demodulating device for demodulating a position signal, which indicates a deviation from a reference position on a track of a magnetic disk, using first and second servo signals which have been recorded in a servo area of the magnetic disk alternately in the radial direction and read by a head, comprising:

means for digitally sampling the first and second servo burst signals, which have been read by the head, at a frequency two or more times greater than a servo burst signal frequency;

means for calculating area information of each of first and second servo burst signal waveforms by summing absolute values of the digitally sampled values of respective ones of the first and second servo burst signals; and means for calculating, as a position signal, the difference between the area information of the first servo burst signal waveform and that of the second servo burst signal waveform.

9. A position signal demodulating device for demodulating a position signal, which indicates a deviation from a reference position on a track of a magnetic disk, using first and second servo signals which have been recorded in a servo area of the magnetic disk alternately in the radial direction and read by a head, comprising:

means for digitally sampling the first and second servo burst signals, which have been read by the head, at a frequency two or more times greater than a servo burst signal frequency;

means for calculating, in regard to each of the first and second servo burst signals and through use of digitally sampled values of the first and second servo burst signals, a cosine coefficient and a sine coefficient of signal components;

means for calculating square roots of the sums of the squares of the respective cosine coefficients and sine coefficients, the calculated square roots being amplitude information of each of the first and second servo burst signals; and means for outputting, as a position signal, the difference between the amplitude information of the first servo burst signal and the amplitude information of the second servo burst signal.

10. A magnetic disk device for reading and writing data from and to a predetermined area of a track on a magnetic disk by positioning a head on the predetermined area, comprising:

a data demodulator for demodulating and outputting data which has been recorded in a data area of the magnetic disk; and a servo demodulator for demodulating and outputting a position signal, which indicates a deviation from a reference position on a track of a magnetic disk, using first and second servo signals which have been recorded in a servo area of the magnetic disk alternately in the radial direction and read by a head, wherein the servo demodulator includes:

means for digitally sampling the first and second servo burst signals, which have been read by the head, at a frequency two or more times greater than a servo burst signal frequency;

means for calculating area information of each of first and second servo burst signal waveforms by summing absolute values of the digitally sampled values of respective ones of the first and second servo burst signals; and means for calculating, as a position signal, the difference between the areas information of the first servo burst signal waveform and that of the second servo burst signal waveform.

11. A magnetic disk device for reading and writing data from and to a predetermined area of a track on a magnetic disk by positioning a head on the predetermined area, comprising:

a data demodulator for demodulating and outputting data which has been recorded in a data area of the magnetic disk; and a servo demodulator for demodulating and outputting a position signal, which indicates a deviation from a reference position on a track of a magnetic disk, using first and second servo signals which have been recorded in a servo area of the magnetic disk alternately in the radial direction and read by a head, wherein wherein the servo demodulator includes:

means for digitally sampling the first and second servo burst signals, which have been read by the head, at a frequency two or more times greater than a servo burst signal frequency;

means for calculating, in regard to each of the first and second servo burst signals and through use of digitally sampled values of the first and second servo burst signals, a cosine coefficient and a sine coefficient of signal components;

means for calculating square roots of the sums of the squares of the respective cosine coefficients and sine coefficients, the calculated square roots being amplitude information of each of the first and second servo burst signals; and means for outputting, as a position signal, the difference between the amplitude information of the first servo burst signal and the amplitude information of the second servo burst signal.

* * * * *

UNITED STATES PATENT AND TRADEMARK OFFICE
CERTIFICATE OF CORRECTION

PATENT NO.      : 6,122,117
DATED           : September 19, 2000
INVENTOR(S)     : Koichi Aikawa It is certified that error appears in the above-identified patent and that said Letters Patent is hereby corrected as shown below:

Title page,
Item [57], ABSTRACT,
Line 1, delete "Disclosed is a" and insert -- A --.
Line 6, delete "read. The position signals demodulating method" and insert -- read, --.

Column 1,
Line 37, insert -- . -- (period) after "PB".

Column 9,
Line 34, delete "from" and insert -- in --.
Line 60, delete "is" and insert -- in --.

Column 10,
Line 5, delete "is" and insert -- in --.

Column 11,
Line 6, delete "a" and insert -- the -- therefor.
Line 14, insert -- the -- after "valves of".
Line 16, delete "the" and insert -- a -- therefor.

Column 12,
Line 7, after "second servo" insert -- burst --.
Line 19, delete "a position signal, the" and insert -- the position signal, a -- therefor.
Line 57, delete "a" (first and second occurrence) and insert -- the -- therefor.
Line 58, after "second servo" insert -- burst --.

Column 13,
Line 4, delete "a position signal, the" and insert -- the position signal, a -- therefor.
Line 17, delete "a" and insert -- the -- therefor.
Line 18, after "second servo" insert -- burst --.

UNITED STATES PATENT AND TRADEMARK OFFICE
CERTIFICATE OF CORRECTION

PATENT NO.   : 6,122,117
DATED        : September 19, 2000
INVENTOR(S)  : Koichi Aikawa It is certified that error appears in the above-identified patent and that said Letters Patent is hereby corrected as shown below:

Column 14,
Line 1, delete "wherein".

Signed and Sealed this

Twenty-ninth Day of April, 2003

JAMES E. ROGAN
*Director of the United States Patent and Trademark Office*